114-303 SR
4/7/87 OR 4 000,250

United States Statutory Invention Registration [19]

[11] Reg. Number: H250
[43] Published: Apr. 7, 1987

Taylor

[54] HIGH EFFICIENCY MARINE ANCHOR SYSTEM

[75] Inventor: Robert J. Taylor, Camarillo, Calif.

[73] Assignee: The United States of America as represented by the Secretary of the Navy, Washington, D.C.

[21] Appl. No.: 865,706

[22] Filed: May 19, 1986

[51] Int. Cl.[4] ..... B63B 21/24
[52] U.S. Cl. ..... 114/303; 114/309; 114/304

*Primary Examiner*—David H. Brown
*Attorney, Agent, or Firm*—Robert F. Beers; Joseph M. St.Amand

[57] ABSTRACT

An improved high efficiency mooring anchor is lightweight and when operated in tandem provides holding capacity equal to or greater than twice the holding capacity of a single anchor. The shank is designed to hold at least 2½ times the anchor capacity. Hollow streamline flukes are used and stoppers are mounted on the palms at a maximum distance from the trunion located at the apex of the anchor crown.

12 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH EFFICIENCY MARINE ANCHOR SYSTEM

BACKGROUND OF THE INVENTION

This invention relates generally to anchors and particularly to a drag embedment anchor effective in a wide range of seafloor materials, and especially for use in tandem to effectively develop a system capacity equal to or greater than twice the capacity of a single anchor.

The mooring anchor disclosed in U.S. Pat. No. 3,015,299 is a high efficiency anchor which, in the past, has satisfied some of the needs for a general purpose anchor, and has provided a baseline for better and more efficient anchors. However, the aforementioned anchor has experienced structural problems, has difficulty tripping and digging into hard soil, is not suitable for fabrication in sizes above 15,000 lbs.; further, it is not suitable for use in tandem. Nevertheless, the U.S. Pat. No. 3,015,299 anchor has been the best all around performer and the most efficient general soil anchor of all the prior art anchors. Although some of the newer high efficiency anchors are exceptional single soil type anchors, none perform fully satisfactory for good overall anchoring capability in a variety of situations where seafloor soil type is not known. Some anchors fail to trip and dig-in in soft mud; some have difficulty penetrating very dense sand; some are only marginally stable in sand and mud; and some have only moderate or marginal capacity in mud. And, none of the prior anchors when used in tandem developed much more than the full rated capacity of a single anchor, frequently less. Some became very unstable when used in tandem.

Tandem anchors offer a lighter weight alternative to single large anchors which are difficult to install and almost impossible to retrieve. Tandem anchors, also called piggyback anchors, are used in commercial practice, but only when the first anchor fails to hold its rated (single anchor) capacity. With a piggyback anchor attached, the two anchor system is loaded to the expected capacity of one single anchor. Conventional commercial anchors presently available are not designed to tolerate or hold more than the rated capacity of a single anchor, and when used in tandem, the combined capacity of the tandem system is expected to equal only the rated capacity of the single primary anchor.

SUMMARY OF THE INVENTION

The purpose of the present invention is to provide a relatively light weight, general purpose, movable fluke anchor that is streamlined for good performance in harder soils and most importantly is structurally designed to be most efficiently used in tandem. This highly efficient general soil type anchor, has a high holding power to weight ratio, and the ability when used in tandem for developing a system capacity of up to 2½ times or more the load capacity of a single anchor.

A shank which extends through the bottom of the anchor crown enables connection of anchors in tandem directly through the anchor shank. The shank, therefore, is constructed to safely hold at least 2½ times or more the load capacity of a single anchor.

Improved stopper blocks are mounted on the anchor mud/tripping palms at the greatest distance from the anchor trunion to significantly reduce stress at the anchor trunion/stopper/crown area.

The anchor flukes are of box-like construction to lighten the weight, reduce stresses, and streamline the flukes so as to reduce penetration resistance and eliminate soil entrapment. The flukes are integral with the anchor crown, as are the mud palms, and together form the anchor fluke assembly.

A trunion pin is the main connection between the fluke assembly and the anchor shank. Stabilizers are bolted to opposite sides of the crown and extend inwardly from either side of the crown to the ends of the trunion pin which holds the crown assembly to the anchor shank. By removal of the stabilizers and trunion pin, the anchor can easily be disassembled for compact stowage and/or transportation.

It is an object of the invention, therefore to provide a highly efficient marine anchor having at least twice the normal holding capacity for a single anchor when connected and used in tandem.

Another object of the invention is to provide an improved sturdy fluke stopper permitting reduced anchor shank weight.

A further object of the invention is to provide a highly efficient marine anchor for overall general use in various sea soils, and which is constructed to provide greater structural strength with minimal material and reduced weight.

Yet, another object of the invention is to provide an improved marine anchor for more efficient tandem system operation, and ease in disassembly for transportation and compact stowage.

DESCRIPTION OF THE PREFERRED EMBODIMENT

Figure 1:
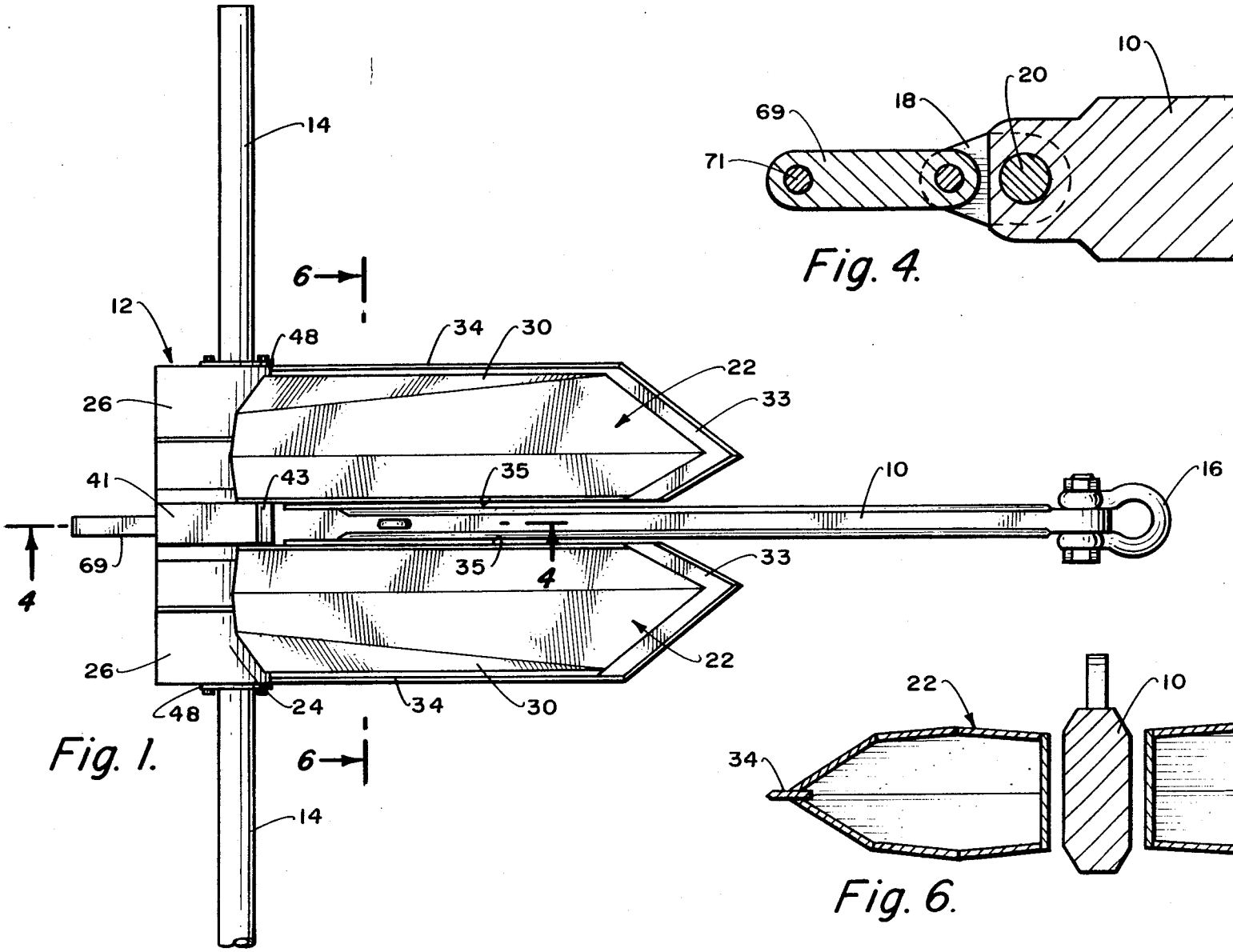
FIG. 1 is a general plan view of the high efficiency marine anchor.
Figure 2:
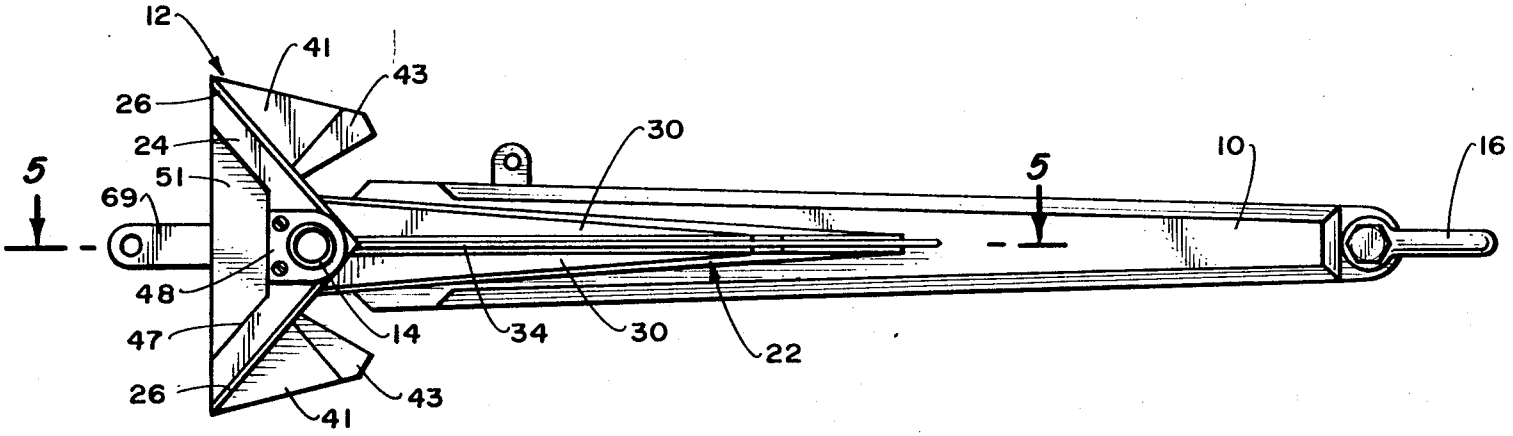
FIG. 2 shows a side view of the anchor of FIG. 1.
Figure 3:
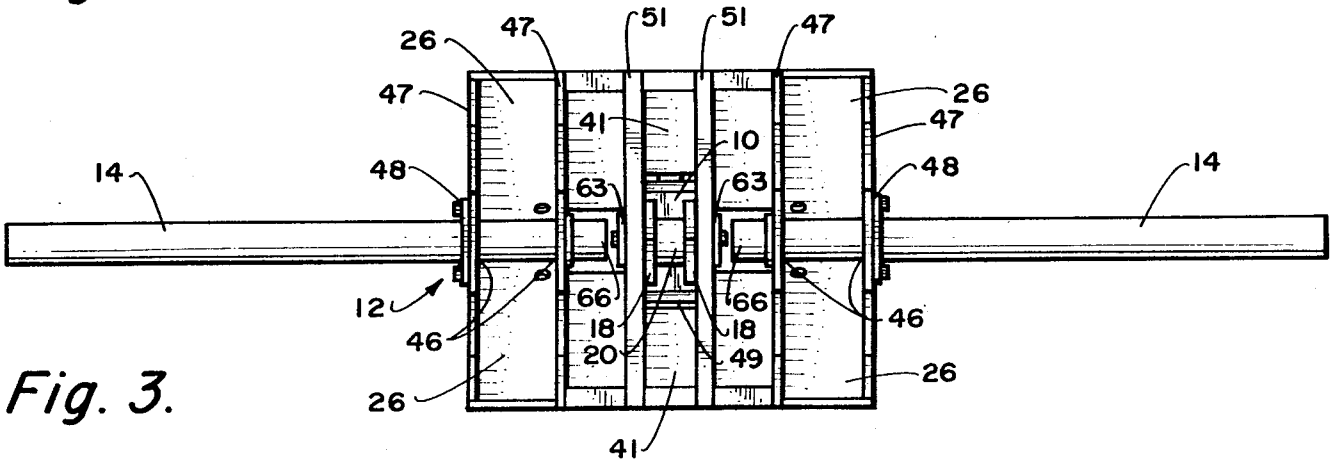
FIG. 3 is a bottom view of the anchor of FIG. 1.

In FIGS. 1—3 is illustrated a high efficiency marine anchor having a shank 10, a fluke assembly 12, and a pair of stabilizers 14.

Figure 4:
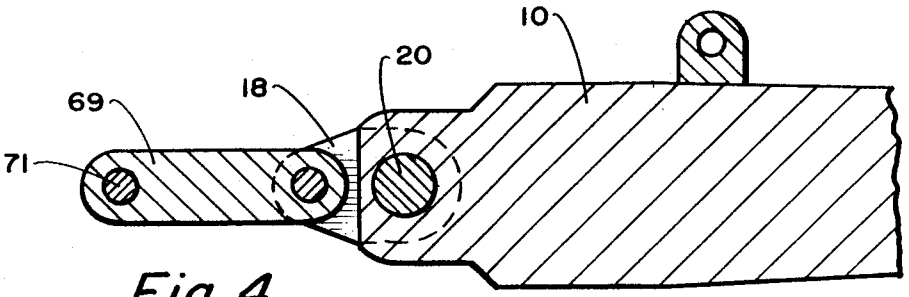
FIG. 4 is a sectional view taken along line 4—4 of FIG. 1.
Figure 6:
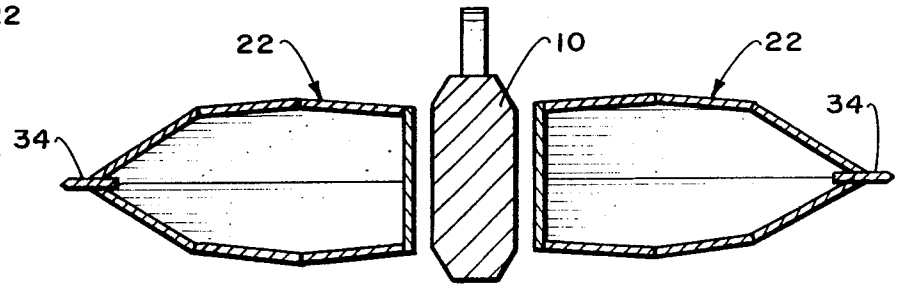
FIG. 6 is a sectional view taken along line 6—6 of FIG. 1.

Shank 10 is of plate, cast, or forged steel construction and may be of an octagon cross-sectional shape (see FIG. 6), for example. The vertical or longer cross-sectional dimension of the shank provides greater strength against the bending moment of the flukes and permits greater penetrability of the shank itself into the ocean bottom. The shank tapers slightly toward the forward end to which is attached the usual shackle 16. The base or aft end of the shank is provided with a heavy duty padeye 18 and a horizontal concentric bore 19 for receipt of a trunion bar or pin 20, as shown more clearly in FIG. 4, and hereinafter described.

Figure 5:
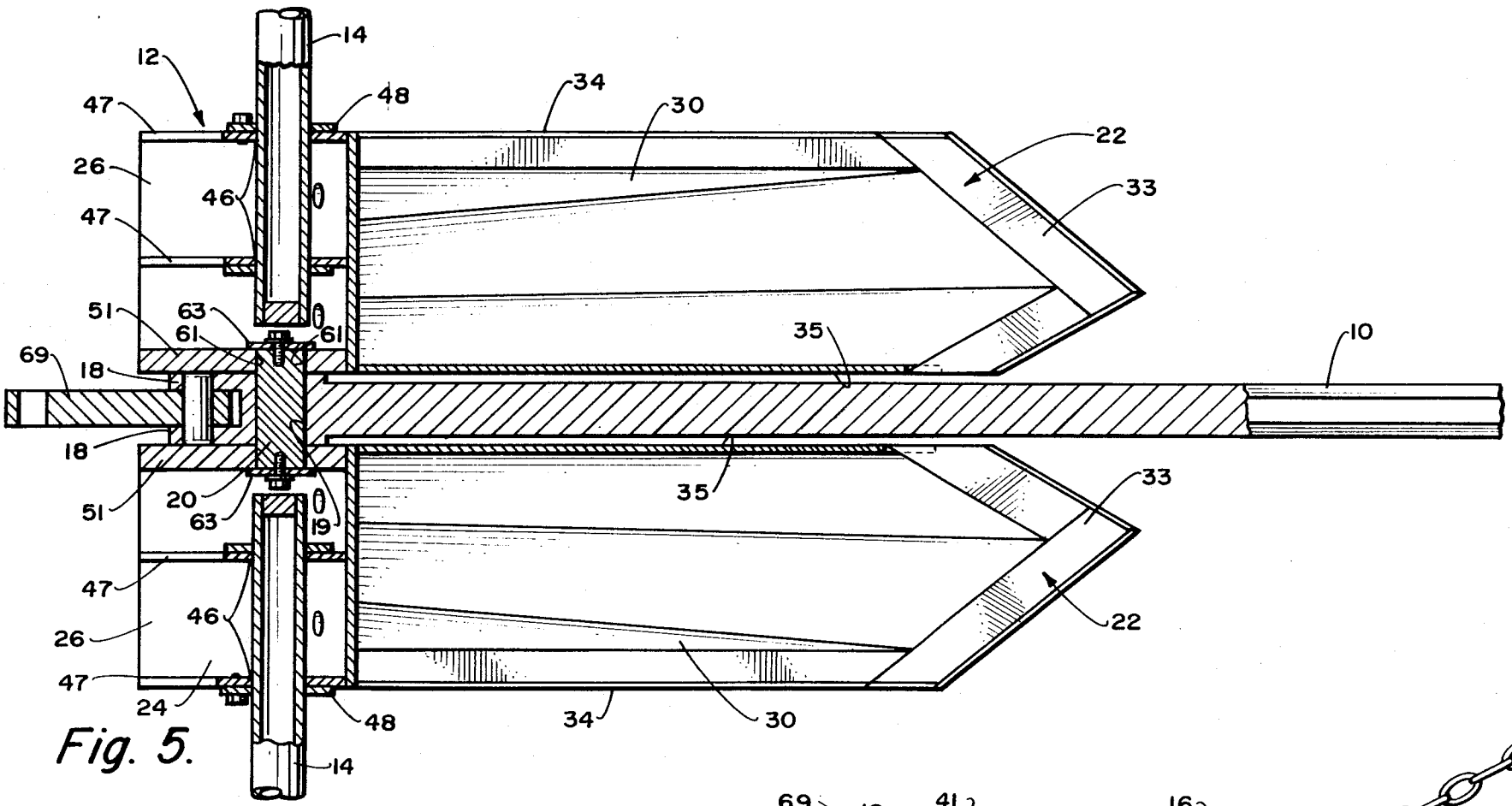
FIG. 5 is a sectional view taken along line 5—5 of FIG. 2.

An important feature of the invention is the unitary construction of the fluke assembly 12, which includes flukes 22, crown 24 and tripping palms 26. The construction of the crown and tripping palm portions of the fluke assembly, when formed from cast steel provides a reduction in manufacturing expense. The flukes 22 are generally hollow and of box-like construction, as shown more clearly in the cross-sectional views of FIGS. 5 and 6. This construction operates to reduce stresses, and both lighten and streamline the flukes. The flukes 22 are preferably made from steel plate with tapered outer walls 30 and chamfered edge plates along the forward edges 33 and sides 34 opposite from the sides adjacent to anchor shaft 10, as shown in the drawings, particularly FIGS. 1, 2, 4 and 5. The fluke walls 35 adjacent the shank 10 are flat and parallel to the shank surface. Flukes 22, in turn, are welded to the crown 24 portion of the fluke assembly 12. While the crown and tripping palms portion of the fluke assembly can be made from welded construction, a unitary cast steel construction is more efficient and more economical. The anchor uses a bilateral fluke construction, where the fluke assembly can move and is fully operable on either side of the shank.

Each of the flukes 22 are made with smooth surfaces and with sharp edges 33 and 34 rather than the conventional flat stiffened plates. This construction provides greater structural strength with minimal material. In operational terms, a smaller anchor handling unit can be used to deploy a high capacity anchor. This fluke assembly helps to provide an anchor with a holding power to weight ratio greater than any of the prior art general type anchors.

Fluke stoppers 41 are located on the tripping palms 26 and located as far away from the trunion as possible to reduce bending moments on the shank so that the weight of the shank can be reduced and the stoppers themselves are less easily damaged. The stoppers 41 can be cast along with the crown and palms as a single unit or separately attached thereto. Stopper wedge pieces 43 are readily attached to the forward ends of the stoppers 41, as shown in FIG. 2, for reducing the fluke angle for hard seafloor conditions. Alternately, the fluke stoppers can be mounted on the shank 10 and properly distanced from the trunion to reduce bending moments.

Stabilizers 14 are made from standard circular pipe and are removable from base sockets which are formed by holes at 46 in the stiffening ribs 47 of the crown and palms section of the fluke assembly 12. Each of the stabilizers 14 can be attached to the outer ribs 47 by means of a flange 48 and bolts.

The heavy duty padeye 18 is built into the crown of the shank 10 so that when multiple anchor arrangement is required, crown-shackle tandem rigging can be employed. The crown-shackle rigging method (attachment to the aft end of the shank) has been proven to be superior to palm-shackle method (attachment to the palms) or to the shank-shackle method (attachment near the forward end of the shank) of riggings because it is more stable, does not inhibit the fluke opening 49, easier to install.

The mud or tripping palms 26 are stiffened by the ribs 47 and extra heavy ribs or box beams 51 which form sides to the fluke opening 49. This enables the anchor to withstand harsh environment. The anchor generally is made from mild strength steel to minimize construction cost. The present anchor, which is designed for use both singly and in tandem combination effectively, greatly increases the flexibility for various loads and mooring requirements, and thereby reduces the number of anchors and number of anchor sizes needed in an anchor inventory.

The primary penetration resistance on an anchor during the initial embedment phase is on the fluke. The resistance is a function of the normal force on the fluke and the coefficient of friction between the soil and the anchor fluke surface. In the present anchor the coefficient of friction between the soil and fluke surface is about 0.3. In the prior patent anchor, because of trapped sand between the open rib stiffeners, the coefficient of friction is between 0.5 and 0.7. To ensure penetration of the prior patent anchor in hard soils, dense sands in particular, the fluke angle must be reduced to reduce the normal force on the fluke and thereby reduce the penetration resistance force. The drawback of reducing the fluke angle is that with a smaller normal force, which is related to the horizontal soil resistance, the total anchor penetration and thus the ultimate capacity of the anchor is reduced. The present anchor has proven to be at least 30 percent more efficient in sand than the aforementioned U.S. Pat. No. 3,015,299 anchor.

The mud or tripping palms are integral with the crown and flukes of the fluke assembly and are used in sand or mud. The simple removable stabilizers 14 on the present anchor are of inexpensive construction, using standard pipe bolted onto the side of the anchor crown-/palm. These stabilizers have been found to be more effective in preventing anchor roll during drag than prior more complicated stabilizers.

Trunion pin 20 passes through concentric bore 19 in the aft end of shank 10 and through similar bore 61 in heavy ribs 51 of the fluke assembly 12. Keeper plates 63 are bolted onto each end of trunion pin 20 to retain the trunion pin in place. The inward ends 66 of the stabilizer bars 14 act as a backup to keep the trunion pin in place if for any reason the keeper plates 63 should come loose.

Figure 7:
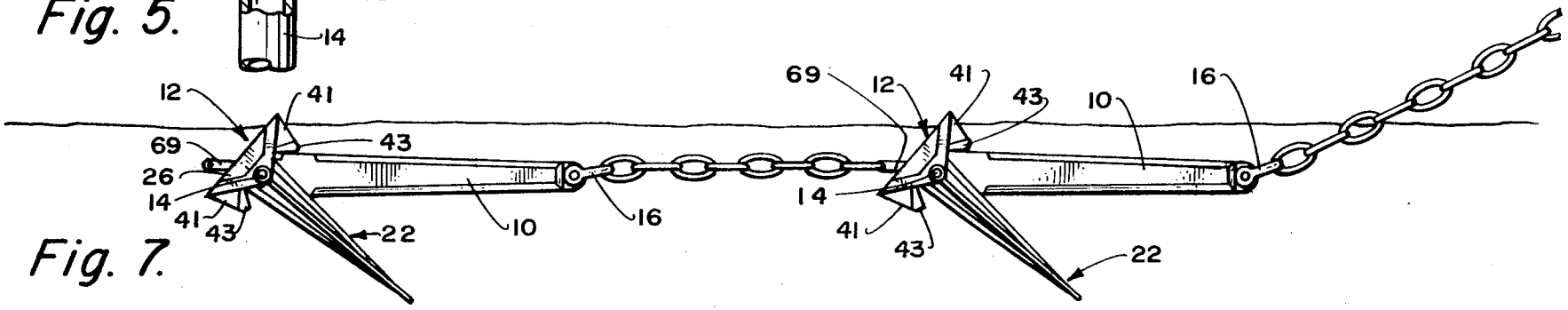
FIG. 7 shows the use of two high efficiency marine anchors connected in tandem.

The anchor shank 10 and fittings are designed to hold at least 2½ times the capacity of a single anchor to allow full development of tandem anchor system capacity. Link 69 (shown in FIGS. 1, 2, 4, 5 and 7) connected to padeye 18 to the aft end of shank 10 allows a direct connection through the shank to a tandem anchor, as shown in FIG. 7, by way of example, but with flexibility to eliminate interference with the palms of the fluke assembly. Link 69 acts as an extension of shank 10, but since it is hinged at padeye 18, the link can be moved or swing within the limits afforded between the bottom sides of the two anchor palms 26.

Various size anchors (100 lb., 1,000 lb., 6,000 lb., 10,000 lb.) were tested as single and tandem anchors in sand and mud. The total performance for each anchor was determined through instruments located on the anchor and on a pull test platform. For example, instrument packages on the anchor shank and connected to the anchor shackle included instruments to measure load, anchor depth in the seafloor and anchor orientation (roll and pitch). Drag distance was also recorded.

The present type anchor was almost uniformly efficient over the range of sizes tested. It developed holding capacities equal to about 30 times its weight in dense gravelly sand. This type of seafloor is normally difficult anchoring ground, however, the anchor performed consistently.

The holding capacity of the present anchors in tandem system was more than twice the capacity of a single anchor; this was shown when testing 1,000 lb. and 6,000 lb. anchors in sand. While it may seem strange that two anchors can hold more together than they can individually, they actually do. This occurs because the tandem anchor penetrates deeper than it could have as a single anchor. In sand, it drags into the trough created by the first anchor allowing it to penetrate deeper. The added depth causes an increase in holding capacity. In other words, the tandem (second) anchor is ultimately pulled by the forward (first) anchor and interconnecting shank-to-shank mooring line from a lower point in the seafloor than the forward anchor because it encounters less penetrating resistance in the disturbed seafloor soil and less upward pull from the forward anchor mooring line. sand and mud. The total performance for each anchor was determined through instruments located on the anchor and on a pull test platform. For example, instrument packages on the anchor shank and connected to the anchor shackle included instruments to measure load, anchor depth in the seafloor and anchor orientation (roll and pitch). Drag distance was also recorded.

The present type anchor was almost uniformly efficient over the range of sizes tested. It developed holding capacities equal to about 30 times its weight in dense gravelly sand. This type of seafloor is normally difficult anchoring ground, however, the anchor performed consistently.

The holding capacity of the present anchors in tandem system was more than twice the capacity of a single anchor; this was shown when testing 1,000 lb. and 6,000 lb. anchors in sand. While it may seem strange that two anchors can hold more together than they can individually, they actually do. This occurs because the tandem anchor penetrates deeper than it could have as a single anchor. In sand, it drags into the trough created by the first anchor allow it to penetrate deeper. The added depth causes an increase in holding capacity. In other words, the tandem (second) anchor is ultimately pulled by the forward (first) anchor and interconnecting shank-to-shank mooring line from a lower point in the seafloor than the forward anchor because it encounters less penetrating resistance in the disturbed seafloor soil and less upward pull from the forward anchor mooring line.

Since this anchor has the unique capability of sustaining full tandem system capacity, smaller anchors can be used to satisfy large mooring requirements. Smaller anchors used in tandem are more efficient, easier to handle and much easier to recover than a single large anchor, especially in mud. The proven ability to use this anchor in single and tandem arrangement greatly expands the anchor's flexibility, and a broad range of mooring requirements are satisfied with a limited inventory of anchors.

A 100 lb. anchor of the present invention develops nearly the same holding capacity as a 200 lb. anchor of the U.S. Pat. No. 3,015,299 design. A 1,000 lb. anchor of the present invention will hold three times more than than a 3,000 lb. LWT anchor in mud and about ⅔ as much in sand. A single 6,000 lb. anchor of the present type developed approximately 100,000 lb. load at 80–90 feet of drag in mud, and two 6,000 lb. anchors developed approximately 200,000 lbs. load at the same distance (greater than 300,000 lbs. can be expected). The fact that the first anchor in the tandem combination remains stable when loaded by the tandem or piggyback anchor is a key feature, making the greater load capacity possible.

Obviously many modifications and variations of the present invention are possible in the light of the above teachings. It is therefore to be understood that within the scope of the appended claims, the invention may be practiced otherwise than as specifically described.

What is claimed is:

1. A light-weight, high efficiency mooring anchor for general use in a variety of seafloor materials and for effectively developing a system capacity greater than twice the capacity of the anchor when connected in tandem, comprising:

a. a shank having a forward end with a shackle means for attachment to a mooring cable, an aft end with a trunion bar receiving bore, and a heavy duty padeye means aft of said trunion bar receiving bore;

b. a unitary fluke assembly consisting of a generally angular open box-like crown portion having main sides which also form the palms and which meet at an apex pointing toward the forward end of said shank with twin hollow elongated box-like flukes secured to the apex of the crown portion; said crown portion being disposed equally on either side of said shank with said apex parallel to the traverse axis passing through said shank bore and disposed toward the aft end of said shank with relation to said traverse axis;

c. said hollow box-like flukes being tapered and streamlined, disposed on opposite sides of said shank and extending toward the forward end thereof;

d. a trunion bar extending transversely of said shank through said bore, and means in said crown portion of the fluke assembly for receiving said trunion bar for pivotally securing the aft end of said shank to said fluke assembly;

e. a pair of socket means extending into the crown portion of said fluke assembly from either side thereof and axially aligned with said trunion bar; the length of said trunion bar being limited by the inner ends of said socket means;

f. a pair of anchor roll stabilizer bars, one each removably mounted in said socket means;

g. stopper means mounted on the palms of said unitary fluke assembly at a maximum distance from the transverse axis of said trunion bar receiving bore and aligned to limit the rotation of said fluke assembly and thus the angle of the flukes with respect to said shank and reduce the bending moment on the shank; wherein, said high efficiency mooring anchor, on being used as a first and forward anchor when connected together in tandem from the aft end of its said shank to the forward end of the shank of a second same-type high efficiency mooring anchor, will operate to cause said second anchor to penetrate deeper into seafloor soils than the second anchor would when operating as a single anchor alone due to the action of said forward anchor dragging the second anchor at a lower level in the seafloor, thereby, because of added depth thus attained by the second anchor, effectively increasing the combined holding capability of the first and second anchors used together in tandem to greater than twice the combined holding capability of the two anchors used singly in seafloor soils.

2. An improved mooring anchor as in claim 1 wherein means is provided to connect similar anchors in tandem at the aft end of said anchor shank.

3. An improved mooring anchor as in claim 1 wherein wedge pieces are fastened to the forward ends of said stopper means to further limit the rotation of said fluke assembly and reduce the angle of the fluke to said shank.

4. An improved mooring anchor as in claim 1 wherein said stabilizer bars are formed from standard heavy duty pipe.

5. An improved mooring anchor as in claim 1 wherein the stabilizer bars when mounted in said socket means provide a backup means for retaining said trunion bar in place.

6. An improved mooring anchor as in claim 1 wherein a heavy duty link is attached to said padeye at the aft end of said shank for connecting anchors in tandem; said heavy duty link acting as an extension of said shank while being rotatable about an axis parallel to the axis of said trunion bar within the limits of the palms of the fluke assembly.

7. An improved mooring anchor as in claim 1 wherein the exterior surface of said flukes is smooth to reduce the coefficient of friction between the flukes and seafloor soil.

8. An improved mooring anchor as in claim 1 wherein said flukes are provided with chamfered edge plates along the forward edges and side edges farthest from said shank.

9. An improved mooring anchor as in claim 1 wherein said stopper means are removably mounted on said palms.

10. An improved mooring anchor as in claim 1 wherein first and second such anchors are connected together in tandem; said second anchor being connected to the aft end of the shank of said first anchor; said first anchor operating to create a trough when dragged along the seafloor such that the second anchor when dragged into the tough created by the first anchor penetrates deeper into the seafloor thereby causing the holding capacity of said first and second anchors in tandem to increase and exceed the total holding capacity of said first and second anchors individually, whereby smaller anchors can be used to satisfy large mooring requirements.

11. An improved mooring anchor as in claim 1 wherein said trunion bar is retained in place for securing the aft end of said shank to said fluke assembly by keeper plates bolted onto each end of said trunion bar.

12. An improved mooring anchor as in claim 1 wherein each of said stabilizer bars are removably mounted in said socket means by means of a removable bolted-on collar flange.

* * * * *